United States Patent
Halverson

(10) Patent No.: US 11,434,014 B2
(45) Date of Patent: Sep. 6, 2022

(54) AIRCRAFT SPARS WITH INTEGRATED POWER CELLS, AND ASSOCIATED SYSTEMS AND METHODS

(71) Applicant: Imagine Aero Inc., Bellevue, WA (US)

(72) Inventor: Kevin Halverson, Fullerton, CA (US)

(73) Assignee: IMAGINE AERO INC., Bellevue, WA (US)

( * ) Notice: Subject to any disclaimer, the term of this patent is extended or adjusted under 35 U.S.C. 154(b) by 414 days.

(21) Appl. No.: 16/597,741

(22) Filed: Oct. 9, 2019

(65) Prior Publication Data
US 2020/0140103 A1    May 7, 2020

Related U.S. Application Data

(60) Provisional application No. 62/744,065, filed on Oct. 10, 2018.

(51) Int. Cl.
*B64D 27/24* (2006.01)
*B64C 3/18* (2006.01)
*B64D 41/00* (2006.01)

(52) U.S. Cl.
CPC .............. *B64D 27/24* (2013.01); *B64C 3/185* (2013.01); *B64D 2041/005* (2013.01)

(58) Field of Classification Search
CPC ... B64C 3/185; B64C 1/065; B64D 2041/005; B64D 29/02; B64D 37/05; B64D 27/24
USPC .............................................. 244/123.9, 53 r
See application file for complete search history.

(56) References Cited

U.S. PATENT DOCUMENTS

| | | | | |
|---|---|---|---|---|
| 3,937,424 A | * | 2/1976 | Meier | H01M 50/00 429/99 |
| 6,119,976 A | * | 9/2000 | Rogers | B64C 39/024 89/1.816 |
| 8,141,822 B2 | * | 3/2012 | Thomas | B64C 3/34 244/135 R |
| 8,967,529 B1 | * | 3/2015 | Bennett | B64D 27/24 446/57 |
| 9,156,559 B2 | * | 10/2015 | Grip | B64C 3/18 |
| 9,845,158 B2 | * | 12/2017 | Liske | B64D 27/24 |
| 10,468,545 B1 | * | 11/2019 | Yang | H02S 30/20 |
| 11,121,557 B2 | * | 9/2021 | Cottrell | H02J 3/46 |
| 2008/0184906 A1 | * | 8/2008 | Kejha | B64C 39/024 102/374 |

(Continued)

FOREIGN PATENT DOCUMENTS

| | | | | |
|---|---|---|---|---|
| CA | 2842408 A1 | * | 10/2014 | ............. B64C 3/185 |
| CA | 3036708 A1 | * | 3/2018 | ........... B64C 39/024 |

(Continued)

OTHER PUBLICATIONS

McGarry et al., Battery Spar, no date, https://ieeesetc.org/wp-content/uploads/sites/313/Battery-Spars-for-UAV.pdf.*

(Continued)

*Primary Examiner* — Christopher P Ellis
(74) *Attorney, Agent, or Firm* — Cozen O'Connor

(57) ABSTRACT

Aircraft spars with integrated power cells, and associated systems and methods are described. A representative aircraft wing spar includes a spar body extending in a spanwise direction, and having a plurality of apertures also extending in a spanwise direction, with individual apertures positioned to receive multiple electrical power cells.

25 Claims, 9 Drawing Sheets

(56) References Cited

U.S. PATENT DOCUMENTS

| | | | |
|---|---|---|---|
| 2013/0099063 A1* | 4/2013 | Grip | B64C 3/26 |
| | | | 156/60 |
| 2014/0252156 A1* | 9/2014 | Hiebl | B64C 39/024 |
| | | | 244/3 |
| 2015/0340672 A1 | 11/2015 | Walpurgis | |
| 2016/0107756 A1* | 4/2016 | Liske | B64C 7/02 |
| | | | 244/54 |
| 2018/0099756 A1* | 4/2018 | Gore | H01M 6/42 |
| 2018/0123165 A1* | 5/2018 | Park | H01M 10/054 |
| 2020/0165012 A1* | 5/2020 | Stamm | B64D 37/02 |
| 2020/0269708 A1* | 8/2020 | Bernhardt | H01M 50/24 |
| 2020/0277062 A1* | 9/2020 | Becker | B64D 41/00 |
| 2021/0347266 A1* | 11/2021 | Bernhardt | B64D 27/24 |

FOREIGN PATENT DOCUMENTS

| | | | | |
|---|---|---|---|---|
| CN | 106240798 A | | 12/2016 | |
| CN | 112839868 A | * | 5/2021 | B64C 3/185 |
| EP | 2343752 A2 | | 7/2011 | |
| EP | 2639152 A2 | * | 9/2013 | B64C 3/185 |
| EP | 3326917 A1 | * | 5/2018 | B60K 1/04 |
| EP | 3435443 A1 | * | 1/2019 | H01M 10/0463 |
| EP | 3594105 A1 | * | 1/2020 | B64C 29/0033 |
| FR | 3071817 B1 | * | 9/2019 | B64C 39/024 |
| GB | 220383 A | | 8/1924 | |
| GB | 2587684 A | * | 4/2021 | B64C 3/185 |
| GB | 2587686 A | * | 4/2021 | F01D 15/10 |
| KR | 20180041423 A | | 4/2018 | |
| KR | 20180041423 A | * | 4/2018 | |
| WO | WO-2018058004 A1 | * | 3/2018 | B64C 39/024 |
| WO | WO-2021158862 A1 | * | 8/2021 | |

OTHER PUBLICATIONS

International Searching Authority, "International Search Report and Written Opinion," PCT/US19/55687, dated Jan. 7, 2020., 17 pages.
Extended European Search Report for EP 19871847.0, dated May 16, 2022, 8 pages.

* cited by examiner

AIRCRAFT SPARS WITH INTEGRATED POWER CELLS, AND ASSOCIATED SYSTEMS AND METHODS

CROSS-REFERENCE TO RELATED APPLICATION

The present application claims priority to U.S. Provisional Application No. 62/744,065, filed on Oct. 10, 2018, which is incorporated herein by reference in its entirety.

TECHNICAL FIELD

The present technology is directed generally to aircraft spars with integrated power cells, and associated systems and methods.

BACKGROUND

As efforts to reduce greenhouse gas emissions have intensified, the transportation industry has been identified as an area in which significant reductions should be made. Within the transportation industry, the commercial air transport sector has been particularly identified as an area for reducing greenhouse gas emissions. Accordingly, this industry sector has investigated batteries as an alternative or supplement to traditional gas turbine engines for powering commercial aircraft. However, this approach has generated several challenges, including how to produce an electrically powered aircraft without increasing the weight of the aircraft to the point that it is no longer commercially feasible. Accordingly, there remains a need for improved techniques directed to electrically powered aircraft.

DETAILED DESCRIPTION

The present technology is directed generally to aircraft spars with integrated power cells, and associated systems and methods. In representative embodiments, the spars can include channels or other apertures in which power cells, e.g., batteries (which typically contain multiple chemical cells), fuel cells, and/or other stored energy devices, are inserted and electrically coupled to each other. In some embodiments (e.g., in the case of fuel cells), the fuel for the cell can be stored in the apertures, in addition to or in lieu of storing the fuel cell itself. The channels can be deliberately manufactured to include gaps, grooves, flutes, and/or other features that provide a gas-escape path in the event that one or more of the power cells fails. Accordingly, debris from the failed power cell can be contained within the spar, while gas emitted by the failed cell is provided with a safe exit path. Positioning the power cells in the spar can reduce the volume occupied by the cells, and can center the weight of the cells at or near the center of lift of the aircraft wing, and/or at the overall center of gravity of the aircraft to which the wing is attached. This in turn can reduce the structural loads (e.g., bending loads) resulting from the weight of the power cells. The composition of the spar can be selected to enhance thermal conductivity, thereby providing a uniform temperature environment in which the power cells operate.

Specific details of embodiments of the present technology are described below with reference to representative aircraft, wings, spars, and power cells. Although representative embodiments are described below with reference to particular geometries and configurations, the technology can be applied to other geometries and/or configurations as well. Some embodiments can have configurations, components, and/or procedures different than those described in this section, and other embodiments may eliminate particular components or procedures. A person of ordinary skill in the art, therefore, will understand that the present technology may include some embodiments with additional features or elements, and/or may include some embodiments without several of the features or elements shown and described below with reference to FIGS. 1-8.

Figure 1:
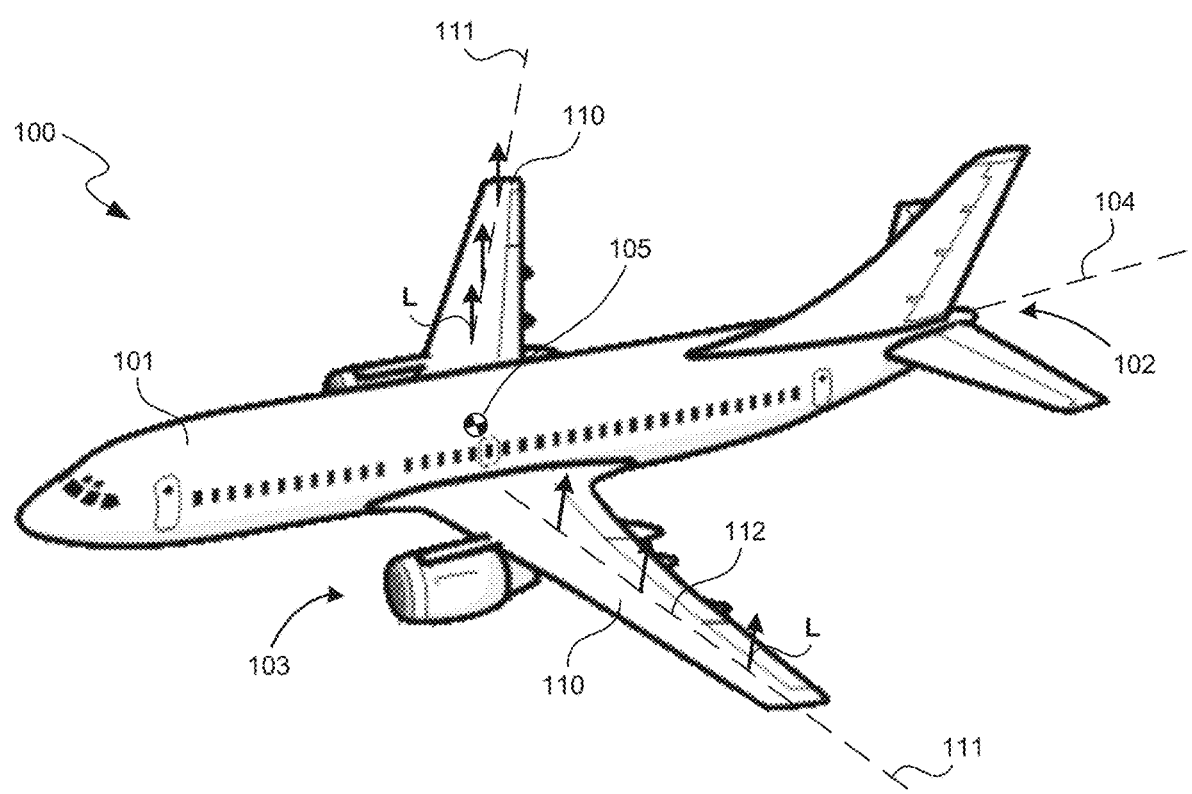
FIG. 1 is a partially schematic illustration of an aircraft suitable for installation of spars in accordance with embodiments of the present technology.

FIG. 1 is a partially schematic, isometric illustration of a representative aircraft 100 that includes spars configured in accordance with embodiments of the present technology. The aircraft 100 can include a fuselage 101 elongated along a longitudinal axis 104, wings 110, each elongated along a spanwise axis 111, an empennage 102, and a propulsion system 103. The propulsion system 103 can be carried by the wings 110 (as shown in FIG. 1) and/or by the fuselage 101. Each wing 110 provides lift, indicated by arrows L, along a center of lift axis 112. The overall aircraft 100 includes an aircraft center of gravity 105, with the center of lift axis 112 typically configured to align or approximately align with the aircraft center of gravity 105 along the longitudinal axis 104. By aligning the center of lift axis 112 with the aircraft center of gravity 105, the aerodynamic forces required to trim the aircraft for level flight can be reduced, thereby reducing aircraft drag.

In a conventional aircraft, the propulsion system 103 includes turbofan engines driven by gas turbines, which are in turn powered by hydrocarbon-based aviation fuels. In embodiments of the present technology, the hydrocarbon fuels can be supplemented with, or replaced by, electrical power provided by power cells. The power cells can be integrated with the structure of the wings 110, as described in further detail below.

Figure 2:
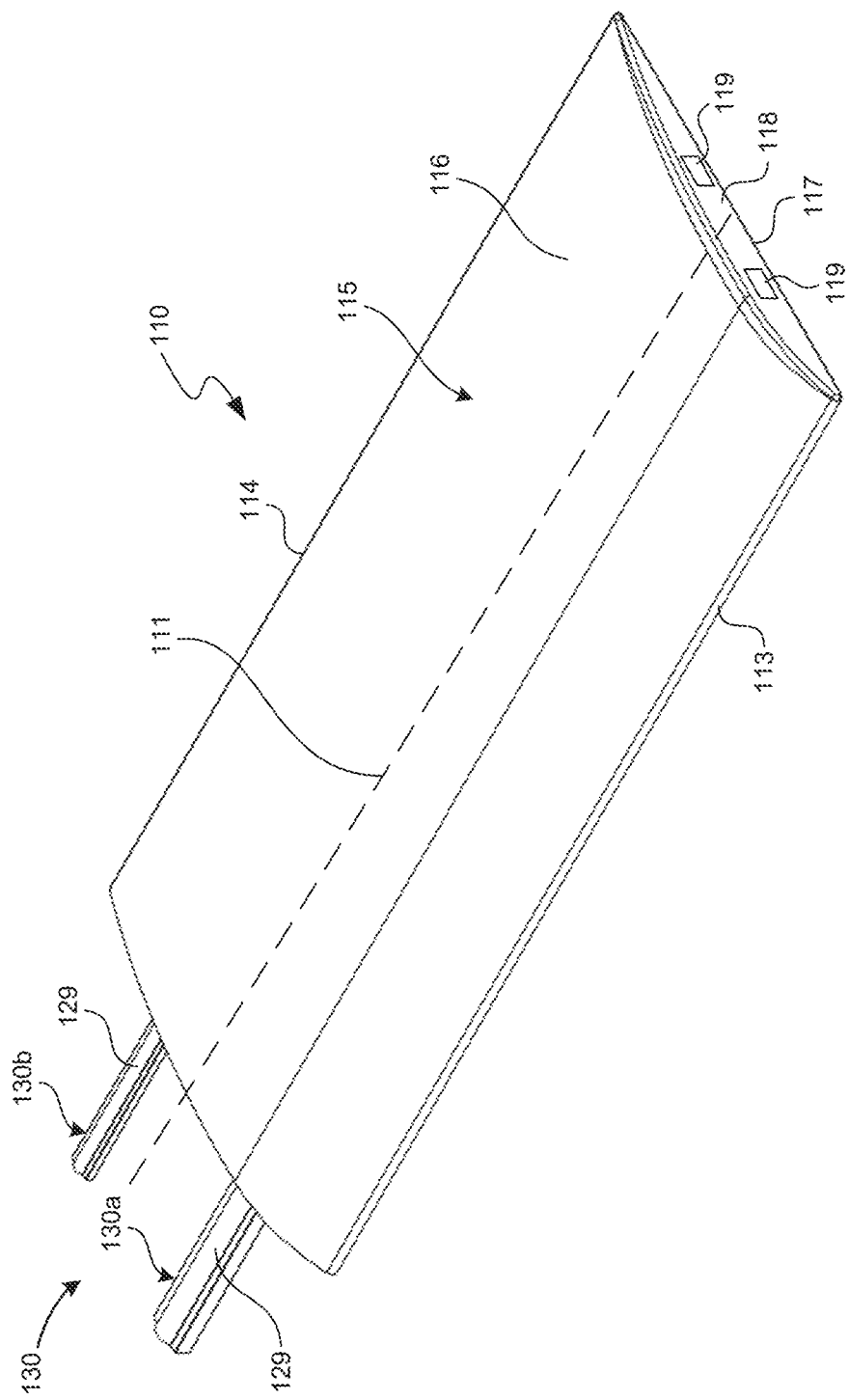
FIG. 2 is a partially schematic illustration of a portion of an aircraft wing having spars configured in accordance with embodiments of the present technology.

FIG. 2 is a partially schematic, isometric illustration of a representative wing 110 suitable for installation on aircraft of the type described above with reference to FIG. 1. The wing 110 can include one or more spars 130 that in turn include a spar body 129 extending generally parallel to the spanwise axis 111. In a representative embodiment, the wing 110 includes two spars 130, illustrated as a forward spar 130a and a rear spar 130b. The spars 130 provide the primary structure for the wing 110, and transmit loads (e.g., including lift forces) to the aircraft fuselage 101 described above with reference to FIG. 1.

The wing 110 includes a skin 115 having an upper surface 116 and lower surface 117 shaped to provide lift at a variety of flight conditions. The wing 110 can further include a leading edge 113 and a trailing edge 114, both shaped for aerodynamic efficiency. The trailing edge 114 can include trailing edge devices for stability and control, which are not illustrated in FIG. 2 for sake of clarity. The wing 110 can further include a wing tip 118 at or near the spanwise terminus of the spars 130. The wing tip 118 and/or other surfaces (e.g., the lower surface 117) can include vents 119, e.g., coupled to internal vent channels, that allow gas from a failed power cell to safely exit the wing 110.

Figure 3:
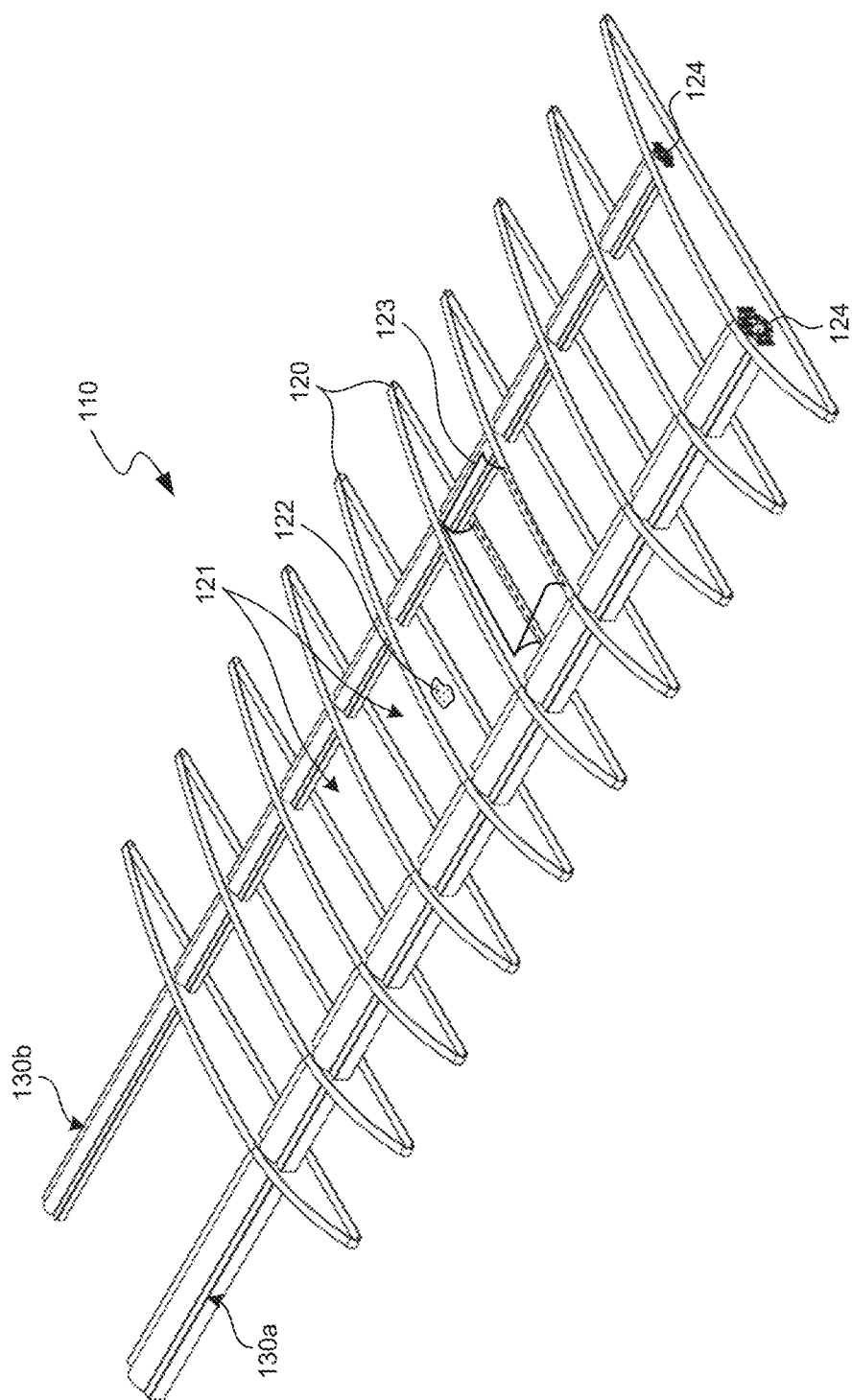
FIG. 3 is a partially schematic, isometric illustration of the wing shown in FIG. 2, with the wing skin removed, to illustrate internal elements configured in accordance with embodiments of the present technology.

FIG. 3 is partially schematic, isometric illustration of the wing 110 shown in FIG. 2, with the skin removed to illustrate further selected internal elements of the wing. The internal elements can include multiple ribs 120 that extend generally transverse to the forward and rear spars 130a, 130b. In a hybrid aircraft (e.g., an aircraft that includes both hydrocarbon-based fuel and electrical power cells), the wing 110 can include multiple fuel volumes 121, typically positioned between neighboring ribs 120 and between the forward and rear spars 130a, 130b. Individual fuel volumes 121 can be contained within the designated regions via fluid-tight coatings 122 and/or bladders 123. The number and/or size of the fuel volumes 121 can be reduced in a hybrid aircraft, as the result of power provided by electrical power cells. The power cells are housed inside the forward and/or aft spars 130a, 130b, as described further below. The spars 130a, 130b can include gas exit paths 124 that align with the vents 119 described above with reference to FIG. 2.

Figure 4A:
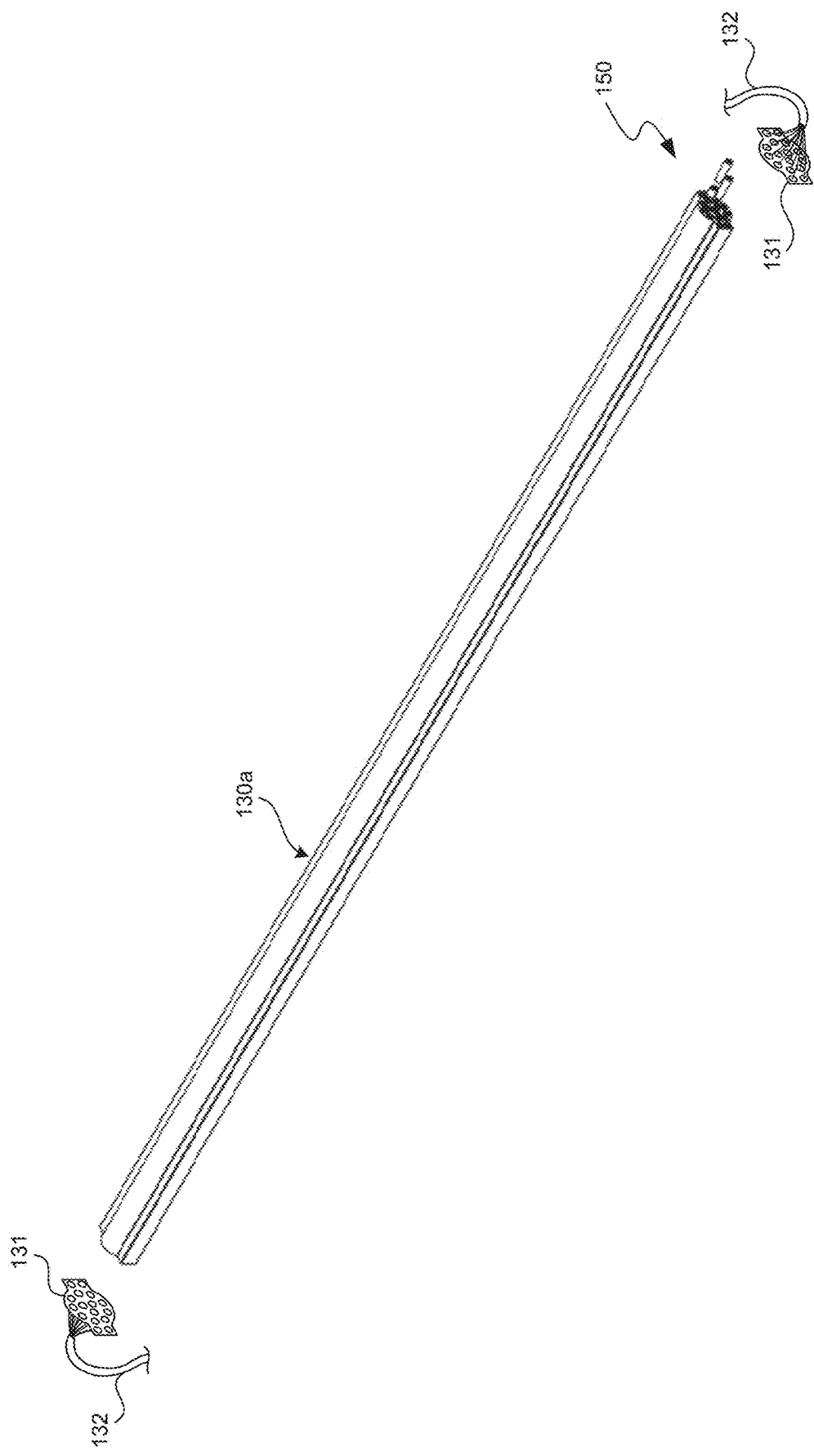
FIGS. 4A-4D are partially schematic, isometric illustrations of representative wing spars and associated power cells, configured and integrated in accordance with embodiments of the present technology.

FIG. 4A is an enlarged illustration of a representative forward spar 130a configured in accordance with embodiments of the present technology. The rear spar 130b (FIG. 3) and/or other spars can have a similar construction. The forward spar 130a can house multiple power cells 150, e.g., chemical batteries and/or fuel cells. Chemical batteries can include any of a number of suitable chemistries, including nickel metal hydride and/or lithium-ion chemistries. Regardless of the chemistry, the forward spar 130a can include one or more manifolds 131 that route the electrical power generated by the power cells 150. Accordingly, each manifold 131 can be connected to a corresponding cable 132 (portions of which are shown in FIG. 4A) which can be used to interconnect power cells or groups of power cells within a given spar, and/or among multiple spars, and ultimately deliver the electrical energy to the aircraft powerplant and/or other electrically driven components of the aircraft.

Representative aircraft powerplants include electric motor-driven propellers, ducted fans, and/or unducted fans. In other embodiments, the powerplant can include a parallel power source that uses battery-supplied electrical power for high-demand phases of flight, such as takeoff, climbout, and/or altitude changes. In a particular embodiment, such a powerplant can include a turboprop, with a motor attached to the same driveshaft as the propeller, and used as needed for the high-demand phases of flight. In still further embodiments, the electrical power can be supplied to accessories that are otherwise driven by the main powerplant (e.g., the gas turbine engine). Such accessories can include pumps, generators, alternators, and/or other mechanically driven devices. In still further embodiments, the electrical power provided to these components can supplement power provided by a gas turbine or other combustion powerplant. In still further embodiments, the electrical power can be provided in lieu of a gas-driven auxiliary power unit (APU).

Figure 4B:
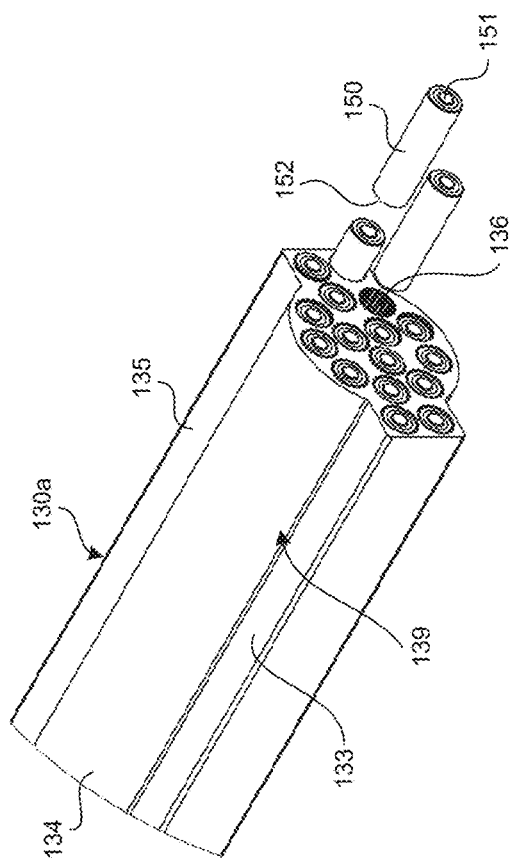

FIG. 4B is an enlarged illustration of the tip region of the forward spar 130a. The forward spar 130a can include a spar body 139 having a number of suitable cross-sectional shapes. In a representative embodiment shown in FIG. 4B, the forward spar 130a includes a central portion 134 positioned between a leading portion 133 and a trailing portion 135. Each of these portions can include one or more cell apertures 136 (e.g., having an elongated circular cylindrical shape) into which the power cells 150 are inserted. An individual power cell 150 can include an anode 151 and a cathode 152. In an embodiment shown in FIG. 4B, the anode 151 and cathode 152 are positioned at opposite ends of the power cell 150 in the manner of a conventional flashlight battery. Accordingly, multiple power cells 150 can be stacked end-to-end within an individual cell aperture 136, with neighboring power cells 150 electrically coupled in series. In a representative embodiment, the power cells 150 can have a standard 18650 lithium ion configuration, and in other embodiments, can have other suitable configurations. The cells 150 can be primary cells (e.g., non-rechargeable cells) and/or secondary cells (e.g., rechargeable cells).

The number of power cells 150 connected in series can be selected depending upon the output voltage of the individual cells, and the desired output voltage to be provided to a downstream electrical component. Accordingly, in some embodiments, a subset of the power cells 150 contained within an individual cell aperture 136 are connected in series, and multiple subsets are connected in parallel to provide the desired current level. The cell apertures 136 can accommodate routing circuitry to provide the desired combination of series and parallel interconnections. For example, each aperture 136 can create a series arrangement of the power cells 150. In this configuration, the voltages of the cells are summed and the total voltage produced is the sum of the voltages produced by the cells in that aperture. For configurations having more than one aperture 136, the electrical output of each aperture 136 can be configured to increase the total voltage by electrically connecting the power cells 150 of one aperture 136 to those of another aperture 136 in a series configuration, or, can increase the total current by connecting the electrical output of the power cells 136 in one aperture 136 to those of another aperture 136 in a parallel configuration. Further, combinations of series and parallel arrangements allow the designer a number of voltage/current configurations which can be chosen for any given electrical requirements.

The number of cell apertures 136 provided in the forward spar 130a can be selected to increase (e.g., maximize) the number of power cells housed in the spar, while preserving the ability of the spar to carry the appropriate structural loads in use. In the illustrated embodiment, the forward spar 138 has a partially circular cross-sectional shape, with rectangular leading portions 133 and trailing portions 135. In other embodiments, the spar can have other suitable cross-sectional shapes, for example, a box shape, an I-beam shape, a C-channel shape, a circular shape, and/or others. In any of these embodiments, because the spar is typically much longer than it is wide or deep, the spar and the cell apertures 136 can be formed using an extrusion process. The extrusion process provides an economical way of manufacturing the spars in a uniform manner so as to readily accommodate power cells 150 of a standard size. This approach also facilitates manufacturing the spars with automated techniques, and/or with fewer individual operations than if the spars were formed with laminated lay-ups or if the apertures were bored, or formed via electrodynamic machining or other subtractive manufacturing techniques.

In particular embodiments, the forward spar 130*a* is formed from a thermally conductive, extrudable material, for example, aluminum (e.g., 6061 or 6075 aluminum), other aluminum alloys, titanium, titanium alloys, and/or thermoplastics. Such materials are particularly suitable for extrusion, and also are sufficiently thermally conductive to transmit heat loads among the power cells 150 contained within the cell apertures 136. This approach can provide a uniform temperature environment in which the power cells 150 operate. While the relatively high thermal conductivity of the forward wings spar 130*a* can also allow heat to be transferred from the power cells 150 outwardly (e.g., into the wing skin, where heat can be removed via conduction and/or convection), it is expected that the more beneficial effect is to simply provide a uniform-temperature environment.

Figure 4D:
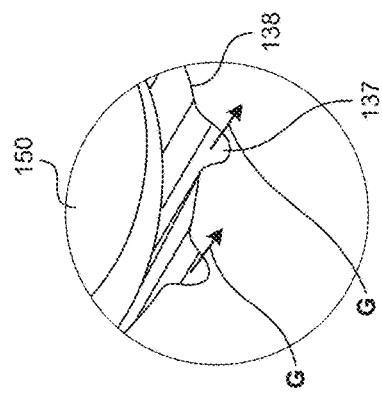
Figure 4C:
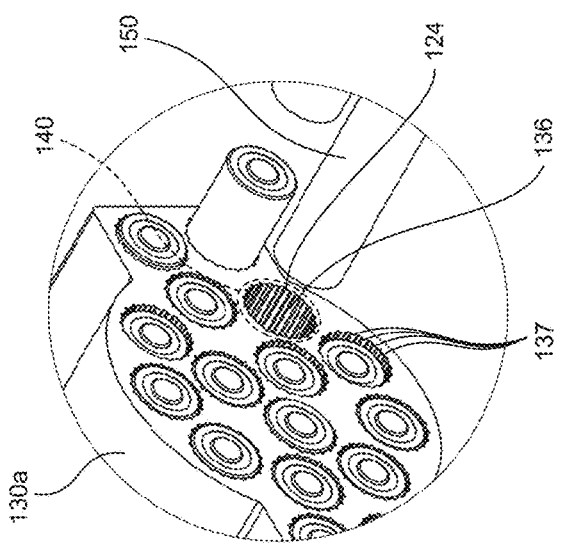

FIG. 4C is an enlarged illustration of a portion of the forward spar 130*a* shown in FIG. 4B, illustrating the cell apertures 136 in greater detail. Each cell aperture 136 can have an inner surface that includes multiple flutes, channels, or grooves 137 (referred to generally as grooves) that provide the gas exit paths 124 described above. In some embodiments, the grooves 137 can be extruded as part of the same extrusion process used to form the spar and the cell apertures 136. In other embodiments, the cell apertures 136 can be formed in accordance with other techniques. For example, the forward spar 130 can include multiple spar apertures 140 (one is shown in dashed lines in FIG. 4C) that receive corresponding inserts, and the inserts can include the flutes, channels, or grooves 137. If the inserts are not circumferentially symmetric, they can include a key or other alignment element to align properly in spar aperture 140. Further details are described below with reference to FIGS. 7 and 8.

The cell apertures 136 can be sized to slidably and, in at least some embodiments, releasably accommodate the power cells 150. Accordingly, individual power cells 150 can be removed and replaced or serviced, as needed. For example, the diameters of the cell apertures 136 can be slightly oversized to accommodate the sliding motion of the cells as they enter and/or exit the apertures 136. The opposing ends of the cell apertures 136 can be accessed so as to push the power cells 150 into or out of the apertures during installation or removal.

FIG. 4D is an enlarged illustration of the tip portion of the forward spar 130*a* shown in FIG. 4C, illustrating the individual grooves 137, and corresponding ridges 138 positioned between neighboring grooves. Escaping gas from a failed power cell can exit the cell aperture 136, as indicated by arrows G, to safely exit the spar and the aircraft with a reduced likelihood for causing other cells to overheat and fail.

Figure 5A:
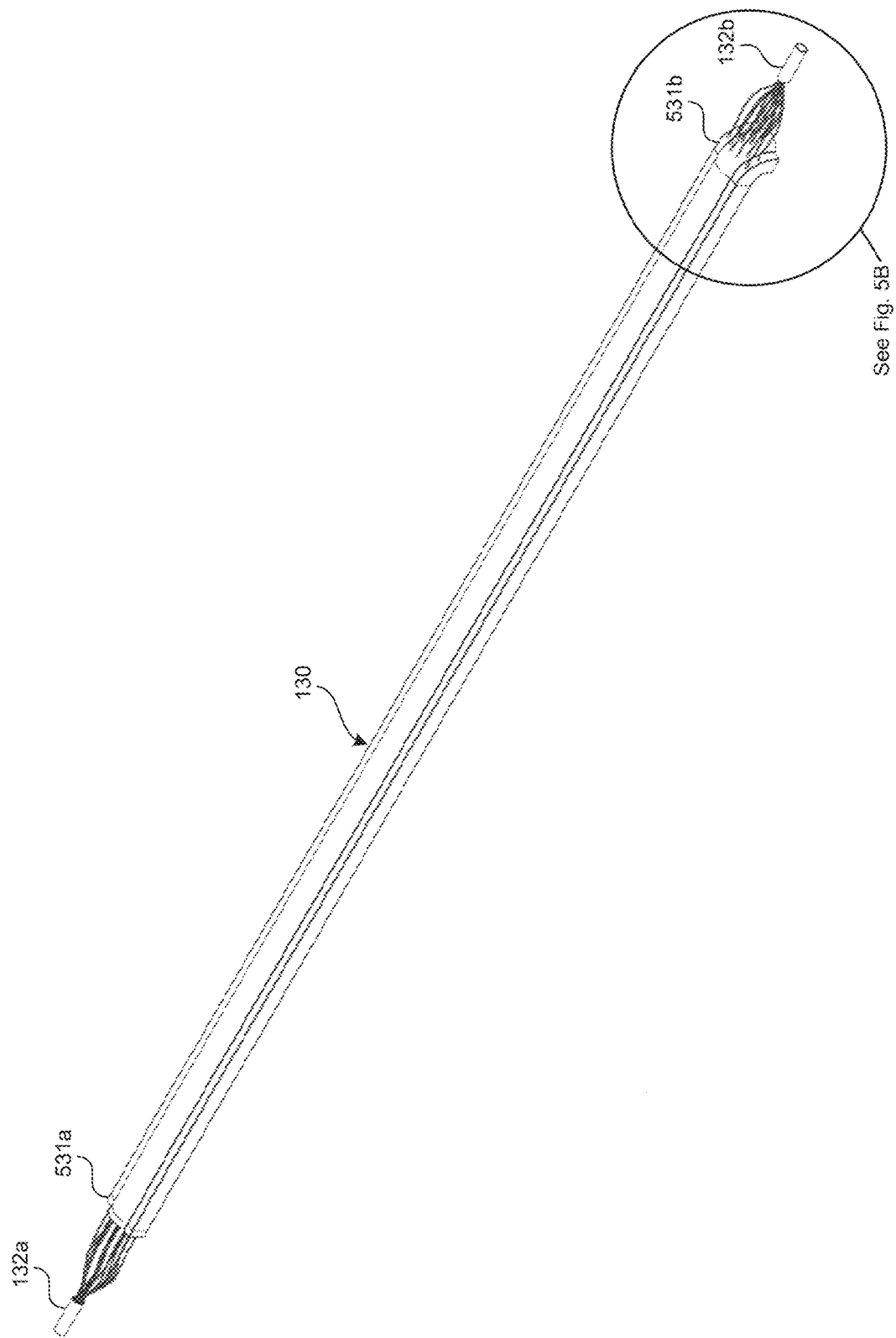
FIGS. 5A and 5B are partially schematic illustrations of a representative wing spar having manifolds and venting arrangements configured in accordance with embodiments of the present technology.
Figure 5B:
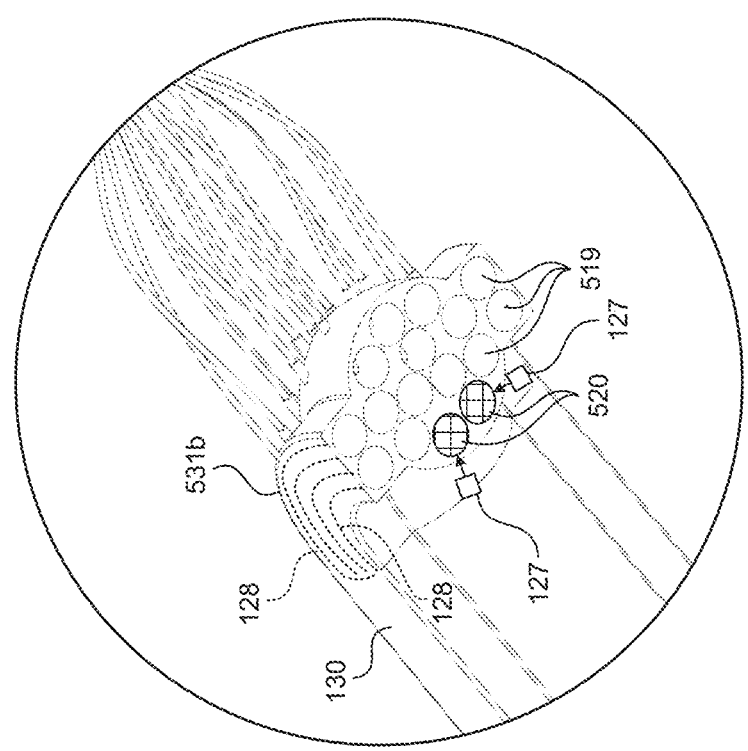

FIGS. 5A-5B illustrate a representative spar 130 configured in accordance with representative embodiments of the present technology. The spar 130 has a shape generally similar to that described above with reference to FIGS. 4A-4D and includes one or more manifolds 531, shown as corresponding first and second manifolds 531*a*, 531*b* that function as end caps for the spar 130. The first manifold 531*a* provides an electrical connection between the power cells within the spar 130 and a corresponding first cable 132*a*. The second manifold 531*b* provides an electrical connection between the power cells within the spar 130 and a corresponding second cable 132*b*. In other embodiments, the spar can include a single cable and a single electrical manifold, e.g., depending on how the cells are connected to each other. In addition, one or more manifolds (e.g., the second manifold 531*b*) provide the terminus of the gas exit flow paths 124 (FIG. 4C) within the spar 130, e.g., via internal vent channels 128 (shown schematically). More specifically, referring to FIG. 5B, the second manifold 531*b* can include multiple vents 519 in fluid communication with the gas exit paths 124 described above. Each vent 519 can provide a downwardly-facing exit through the lower surface 117 of the wing 110 (both shown in FIG. 2), and/or in a rearward direction, e.g., through the wing trailing edge. Each vent 519 can include a separate, releasable cover 520 (two are shown in FIG. 5B) that is normally closed to preserve a generally smooth aerodynamic surface at the wing lower surface 117 during normal operation, and then opens or releases in response to a change in condition within the corresponding aperture 136 (see FIG. 4C). For example, the covers 520 can be coupled to a solenoid or other actuator 127 (shown schematically), and can be opened in response to an overtemperature signal from a temperature sensor. The cover 520 can be re-stowed (or replaced) after the affected power cell(s) within the aperture are replaced or repaired. The spar 531*b* can also include a fail-safe overpressure provision. For example, above a threshold pressure, the covers 120 can release, e.g., by being blown away, or, if hinged, by opening, to allow the gas within the aperture 136 to escape. In another representative embodiment, the cover 520 can respond solely to an overpressure state within the corresponding aperture. For example, the cover 520 can include a molded plug made from a thermoplastic or another suitable material, that is inserted in the vent 519. The plug can be secured via friction or another frangible connection that releases at the threshold pressure.

Figure 6:
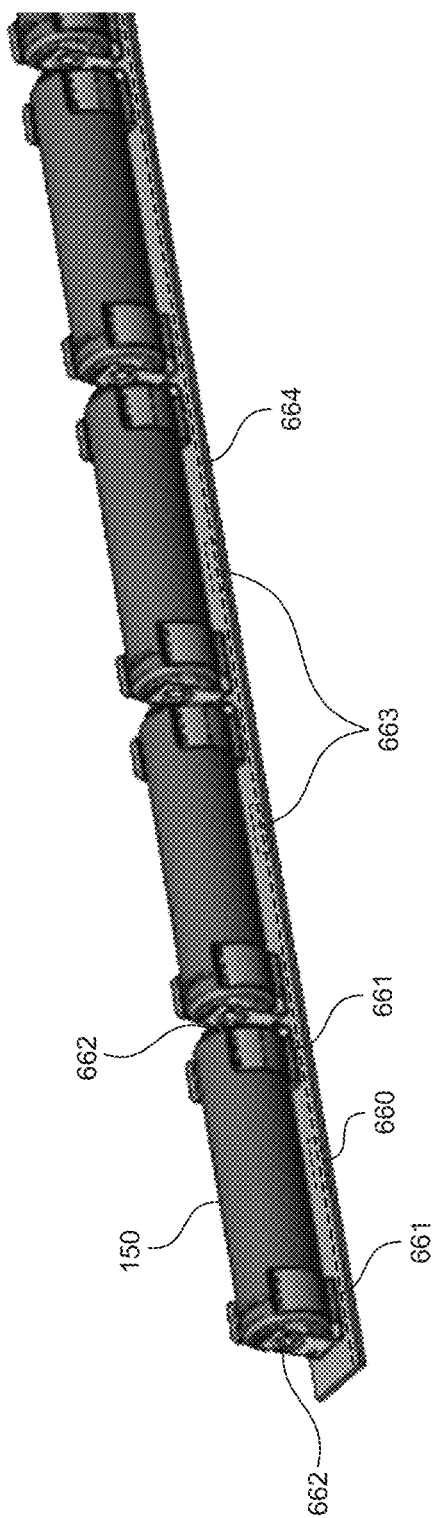
FIG. 6 is a partially schematic, isometric illustration of a support carrying multiple power cells in accordance with representative embodiments of the present technology.

FIG. 6 is a partially schematic, isometric illustration of a portion of a support 660 arranged to carry a plurality of power cells 150 within a spar aperture, e.g., the apertures 136 shown in FIG. 4C. The support 660 can include a plurality of brackets 661 that securely and, optionally, releasably, secure individual power cells 150 to the support 660. For example, the support 660 can include a pair of brackets 661 for each power cell 150. The support 660 can also carry multiple power cell contacts 662 that make electrical contact with the power cell 150 to route power from the power cell 150 within the corresponding aperture 136 (FIG. 4C). In particular embodiments, the support 660 is formed from a printed circuit board (PCB) that includes circuitry 663 and/or cabling 664. The circuitry 663 can include solid state (or other) temperature and/or pressure sensing circuitry, circuitry for balancing power among the power cells 150, and/or otherwise managing the charge of individual power cells 150, and/or circuit elements to activate the actuators described above to vent a given aperture 136 in the event of a cell failure or other over-temperature or over-pressure event. The cabling 664 can be integrated with the support 660, and can be used to connect multiple power cells 150 in parallel and/or in series. In some embodiments, the cabling 664 can provide enough power routing to eliminate the need for one of the manifolds 531*a*, 531*b* shown in FIG. 5A.

Figure 7:
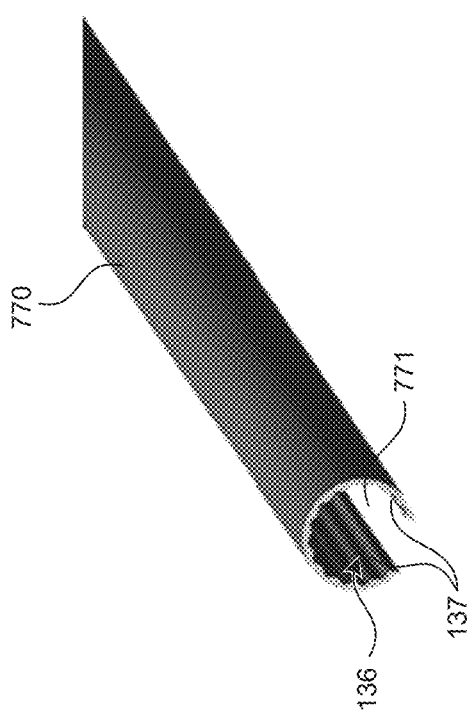
FIG. 7 is a partially schematic, isometric illustration of a portion of an insert for housing power cells in accordance with representative embodiments of the present technology.

As described above with reference to FIG. 4C, the grooves 137 can be formed integrally with the forward spar 130*a*, or can be formed in an insert that is inserted into a spar aperture 140, also shown in dashed lines in FIG. 4C. FIG. 7 is a partially schematic, isometric illustration of a portion of an insert 770 configured to provide this function. The insert 770 includes the cell aperture 136 into which the power cells 150 (FIG. 6) fit, and includes the grooves 137 for venting. Referring to FIGS. 6 and 7 together, the insert 770 can include a gap 771 that accommodates the support 660, with the power cells 150 carried by the support 660 positioned in the cell aperture 136.

In particular embodiments, the insert 770 can be formed from aluminum or a high temperature thermoplastic. In particular embodiments, the insert 770 can be more compliant than the material forming the spar in which it is positioned, so as to avoid transferring structural loads to the power cells 150, except in the case of very high bending loads. The grooves 137, whether formed in the insert 770, or formed directly in the spar, are also compliant. Accordingly, whether the cell aperture 136 is formed in an insert 770, or directly in the spar, the structural loads carried by the spar are passed around the power cells 150. This approach prevents or at least restricts the likelihood for structural loads to cause damage to the power cells 150. In particular embodiments, the grooves 137 and, optionally, the insert 770 can be configured to avoid placing the power cells 150 under bending loads until the spar has passed its structural limit.

Figure 8:
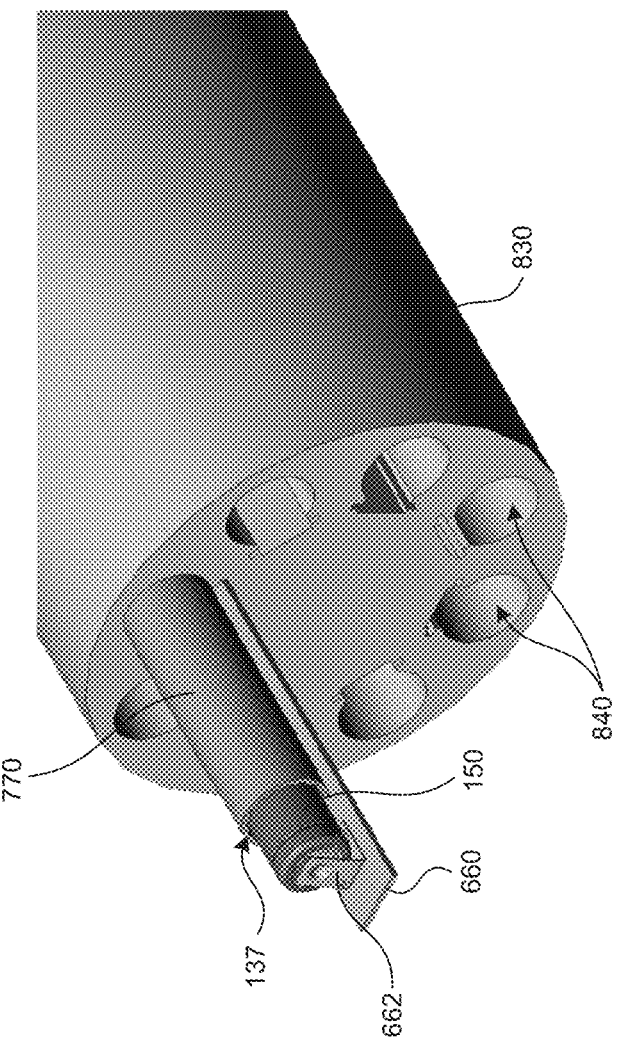
FIG. 8 is a partially schematic, partially exploded illustration of a spar having an insert defining an aperture in which multiple electrical power cells are received, in accordance with embodiments of the present technology.

FIG. 8 is a partially schematic, partially exploded illustration of a representative spar 830 having spar apertures 840 positioned therein. The spar 830 can have a circular shape, as shown in FIG. 8, or other suitable shapes for carrying loads in the associated aircraft. Individual spar apertures 840 receive a corresponding insert 770 having a plurality of grooves 137. The support 660 carries the electrical power cells 150 within the insert 770, which is positioned within the spar aperture 840.

One feature of at least some of the embodiments described herein is that representative spars can combine the structural capabilities for which spars are typically designed, with encasement, thermal management, and/or hazard containment functions. For example, as discussed above, the spar or other component can house the power cells, distribute heat among the power cells, and/or contain debris from failed power cells while venting gases produced by such cells. The ability for a single structure to perform such multiple functions can simplify the overall construction of the aircraft and/or reduce aircraft weight, while also providing functionality not available via other conventional designs.

Another feature of representative embodiments described herein is that the power cells can be aligned along the highest load station of the wing's cross-section. Accordingly, the bulk of the mass of the power cells is at or near the center of lift of the wing, and therefore has a reduced moment arm, so as to improve structural efficiency. Furthermore, by positioning the power cells in the wing, rather than the fuselage, the weight of the cells is borne directly by the wing, which in turn reduces the structural requirements for the interface between the wing and the fuselage. Still further, positioning the power cells within the spar (and/or other structure) allows the remaining volume in the wing to be used for fuel in a hybrid configuration.

Still another feature of representative embodiments described herein is that the materials selected to be included within the cell apertures can be deliberately selected for high temperature capabilities and/or non-flammable properties. Accordingly, the materials (e.g., including the support 660) can avoid or help avoid thermal runaway in the case of a cell failure within the cell aperture. For example, the materials positioned in the apertures can have ignition temperatures above the expected temperature of a failed electrical power cell 150. As a further example, all the components within the apertures can be chosen so as not to contribute additional combustion sources in a situation for which an electrical power cell has failed.

Yet another feature is that the spar can include multiple, spanwise-extending aperture, each containing multiple power cells. An advantage of this feature is that if one power cell fails, the impact is limited to some or all of the power cells in that aperture only. As a result, during flight, the impact to the overall power available to the aircraft is mitigated. Once the aircraft is on the ground, the work required to repair/replace the power cells can be limited to just the affected aperture(s).

From the foregoing, it will be appreciated that specific embodiments of the present technology have been described herein for purposes of illustration, but that various modifications may be made without deviating from the present technology. For example, the spars may have cross-sectional shapes different than those disclosed herein. The power cells and/or the apertures in which they fit can have configurations other than those shown and described herein. While representative embodiments have been discussed above in the context of power cells that are integrated with the wing spar, in other embodiments, the cells can be integrated with other structural elements of the wing, for example, the ribs, and/or stringers. Furthermore, while it is expected that integrating the cells with wing structures will provide a more efficient design, in some embodiments, the cells can be integrated with other structures, for example, structures of the fuselage and/or empennage shown in FIG. 1.

Certain aspects of the technology described in the context of particular embodiments may be combined or eliminated in other embodiments. For example, representative spars can be integrated into aircraft having configurations different than those shown and described herein (e.g., military aircraft, smaller and/or larger aircraft, propeller-driven aircraft, and/or unmanned aircraft). Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the terms "approximately" and "generally" refer to values within ±10% of the reference value, unless otherwise specified. To the extent any materials incorporated herein by reference conflict with the present disclosure, the present disclosure controls.

The following examples provide additional representative embodiments of the present technology.

Examples

1. An aircraft wing spar, comprising:
   a spar body extending in a spanwise direction, the spar body having a plurality of apertures extending generally in parallel in the spanwise direction, with individual apertures positioned to receive multiple electrical power cells.

2. The spar of example 1 wherein an individual aperture has an inner surface that includes multiple, parallel, spanwise grooves, and wherein the spar further comprises:
   a support positioned in the individual aperture, the support including a printed circuit board;
   a plurality of brackets carried by the support and positioned to receive the multiple electrical power cells;

a plurality of power cell contacts carried by the support and positioned to make electrical contact with the multiple electrical power cells;

circuitry carried by the printed circuit board and operably coupled to the multiple electrical power cells to detect at least one state of the multiple electrical power cells;

a releasable cap positioned at an end of the individual aperture;

an actuator operatively coupled to the releasable cap and movable between a first position in which the cap closes the individual aperture, and a second position in which the cap opens the individual aperture to a surrounding environment; and a thermal sensor operably coupled to the actuator to move the actuator to the second position in response to an indication that a temperature within the individual aperture has exceeded a threshold temperature.

3. The spar of example 1 wherein an individual aperture includes surface having a plurality of spanwise-extending grooves.

4. The spar of example 3 wherein the grooves are parallel to each other.

5. The spar of example 1, further comprising an insert positioned in at least one of the individual apertures, and wherein the insert is positioned to receive the multiple electrical power cells.

6. The spar of example 1, further comprising at least one cap positioned to cover at least one of the individual apertures.

7. The spar of example 6, further comprising a temperature sensor, and wherein the cap is movable from an open position to a closed position in response to a signal from the temperature sensor.

8. The spar of example 6, wherein the cap is movable from an open position to a closed position in response to an increase in pressure within the at least one individual aperture.

9. The spar of example 6, further comprising an actuator operably coupled to the cap to mode the cap from an open position to a closed position.

10. The spar of example 1, further comprising the multiple electrical power cells, positioned in at least one of the individual apertures.

11. The spar of example 1 wherein all components within the plurality of apertures have a higher ignition threshold than the combustion temperature of a failed electrical power cell.

12. The spar of example 1 wherein at least some electrical power cells within an individual aperture are connected to each other in series.

13. The spar of example 1 wherein at least some electrical power cells within an individual aperture are connected to each other in parallel.

14. The spar of example 1 wherein at least some electrical power cells within an individual aperture are connected in parallel with at least some electrical power cells within another individual aperture.

15. The spar of example 1 wherein the spar body has a generally round cross-section.

16. The spar of example 1 wherein the spar body has a cross-section that includes a generally round central circular portion between two generally rectangular portions.

17. An aircraft wing spar, comprising:
a spar body extending in a spanwise direction, the spar body having a plurality of apertures extending in the spanwise direction, with individual apertures having grooved walls with grooves extending in the spanwise direction; and multiple battery cells positioned in individual apertures, wherein battery cells within an individual aperture are electrically coupled to each other, and wherein battery cells from different individual apertures are electrically coupled to each other.

18. The spar of example 1 wherein an individual aperture includes a plurality of spanwise-extending grooves.

19. The spar of example 1, further comprising at least one cap positioned to cover at least one of the individual apertures, the at least one cap being responsive to at least one of an increase in pressure or an increase in temperature to move from a closed position to an open position.

20. The spar of example 19, further comprising an actuator coupled to the at least one cap to move the at least one cap from the closed position to the open position.

21. An aircraft, comprising:
a fuselage elongated along a longitudinal axis;
first and second wings extending outwardly from the fuselage, each wing having:
at least one spar body extending in a spanwise direction along a center of lift axis of the wing and aligned along the longitudinal axis with an aircraft center of gravity, wherein each spar body has a plurality of apertures extending in the spanwise direction, with individual apertures having grooved walls with grooves extending in the spanwise direction;
multiple battery cells positioned in individual apertures, wherein battery cells within an individual aperture are electrically coupled to each other, and wherein battery cells from different individual apertures are electrically coupled to each other;
at least one manifold electrically coupled to the battery cells carried by the at least one spar body; and
a fuel volume positioned adjacent to the spar body.

22. The aircraft of example 21, further comprising at least one vent channel coupled in fluid communication with at least one of the apertures to vent gas from within the at least one aperture overboard the aircraft.

23. The aircraft of example 22 wherein the vent channel exits the aircraft at a lower surface of at least one of the first wing or the second wing.

24. The spar of example 21, further comprising at least one cap positioned to cover at least one of the individual apertures, the at least one cap being responsive to at least one of an increase in pressure or an increase in temperature to move from a closed position to an open position.

I claim:
1. An aircraft wing spar, comprising:
a spar body extending in a spanwise direction, the spar body having a plurality of apertures extending generally in parallel in the spanwise direction, with individual apertures positioned to receive multiple electrical power cells.

2. The spar of claim 1 wherein an individual aperture has an inner surface that includes multiple, parallel, spanwise grooves, and wherein the spar further comprises:
a support positioned in the individual aperture, the support including a printed circuit board;
a plurality of brackets carried by the support and positioned to receive the multiple electrical power cells;
a plurality of power cell contacts carried by the support and positioned to make electrical contact with the multiple electrical power cells;

circuitry carried by the printed circuit board and operably coupled to the multiple electrical power cells to detect at least one state of the multiple electrical power cells;

a releasable cap positioned at an end of the individual aperture;

an actuator operatively coupled to the releasable cap and movable between a first position in which the cap closes the individual aperture, and a second position in which the cap opens the individual aperture to a surrounding environment; and a thermal sensor operably coupled to the actuator to move the actuator to the second position in response to an indication that a temperature within the individual aperture has exceeded a threshold temperature.

3. The spar of claim 1 wherein an individual aperture includes surface having a plurality of spanwise-extending grooves.

4. The spar of claim 3 wherein the grooves are parallel to each other.

5. The spar of claim 1, further comprising an insert positioned in at least one of the individual apertures, and wherein the insert is positioned to receive the multiple electrical power cells.

6. The spar of claim 1, further comprising at least one cap positioned to cover at least one of the individual apertures.

7. The spar of claim 6, further comprising a temperature sensor, and wherein the cap is movable from an open position to a closed position in response to a signal from the temperature sensor.

8. The spar of claim 6, wherein the cap is movable from an open position to a closed position in response to an increase in pressure within the at least one individual aperture.

9. The spar of claim 6, further comprising an actuator operably coupled to the cap to mode the cap from an open position to a closed position.

10. The spar of claim 1, further comprising the multiple electrical power cells, positioned in at least one of the individual apertures.

11. The spar of claim 1 wherein all components within the plurality of apertures have a higher ignition threshold than the combustion temperature of a failed electrical power cell.

12. The spar of claim 1 wherein at least some electrical power cells within an individual aperture are connected to each other in series.

13. The spar of claim 1 wherein at least some electrical power cells within an individual aperture are connected to each other in parallel.

14. The spar of claim 1 wherein at least some electrical power cells within an individual aperture are connected in parallel with at least some electrical power cells within another individual aperture.

15. The spar of claim 1 wherein the spar body has a generally round cross-section.

16. The spar of claim 1 wherein the spar body has a cross-section that includes a generally round central circular portion between two generally rectangular portions.

17. An aircraft wing spar, comprising:
a spar body extending in a spanwise direction, the spar body having a plurality of apertures extending in the spanwise direction, with individual apertures having grooved walls with grooves extending in the spanwise direction; and multiple battery cells positioned in individual apertures, wherein battery cells within an individual aperture are electrically coupled to each other, and wherein battery cells from different individual apertures are electrically coupled to each other.

18. The spar of claim 1 wherein an individual aperture includes a plurality of spanwise-extending grooves.

19. The spar of claim 1, further comprising at least one cap positioned to cover at least one of the individual apertures, the at least one cap being responsive to at least one of an increase in pressure or an increase in temperature to move from a closed position to an open position.

20. The spar of claim 19, further comprising an actuator coupled to the at least one cap to move the at least one cap from the closed position to the open position.

21. An aircraft, comprising:
a fuselage elongated along a longitudinal axis;
first and second wings extending outwardly from the fuselage, each wing having:
at least one spar body extending in a spanwise direction along a center of lift axis of the wing and aligned along the longitudinal axis with an aircraft center of gravity, wherein each spar body has a plurality of apertures extending in the spanwise direction, with individual apertures having grooved walls with grooves extending in the spanwise direction;
multiple battery cells positioned in individual apertures, wherein battery cells within an individual aperture are electrically coupled to each other, and wherein battery cells from different individual apertures are electrically coupled to each other;
at least one manifold electrically coupled to the battery cells carried by the at least one spar body; and
a fuel volume positioned adjacent to the spar body.

22. The aircraft of claim 21, further comprising at least one vent channel coupled in fluid communication with at least one of the apertures to vent gas from within the at least one aperture overboard the aircraft.

23. The aircraft of claim 22 wherein the vent channel exits the aircraft at a lower surface of at least one of the first wing or the second wing.

24. The spar of claim 21, further comprising at least one cap positioned to cover at least one of the individual apertures, the at least one cap being responsive to at least one of an increase in pressure or an increase in temperature to move from a closed position to an open position.

25. The spar of claim 24, further comprising an actuator coupled to the at least one cap to move the at least one cap from the closed position to the open position.

* * * * *